(12) United States Patent
Erdfarb

(10) Patent No.: US 7,594,341 B2
(45) Date of Patent: *Sep. 29, 2009

(54) MEASURING DEVICE

(76) Inventor: Jeffrey Erdfarb, 1305 Dickerson Rd., Teaneck, NJ (US) 07666

( * ) Notice: Subject to any disclaimer, the term of this patent is extended or adjusted under 35 U.S.C. 154(b) by 0 days.

This patent is subject to a terminal disclaimer.

(21) Appl. No.: 12/030,905

(22) Filed: Feb. 14, 2008

(65) Prior Publication Data

US 2008/0134536 A1 Jun. 12, 2008

Related U.S. Application Data

(63) Continuation of application No. 10/003,198, filed on Oct. 31, 2001, now Pat. No. 7,343,694.

(51) Int. Cl.
*G01B 3/10* (2006.01)

(52) U.S. Cl. .................... 33/759; 33/679.1; 33/494

(58) Field of Classification Search .................. 33/755, 33/759, 483, 485, 486, 492, 494, 679.1, 1 B, 33/1 C, 1 G, 1 K, 1 BB, 1 SB
See application file for complete search history.

(56) References Cited

U.S. PATENT DOCUMENTS

| | | |
|---|---|---|
| 184,537 A | 11/1876 | May |
| 1,085,905 A | 2/1914 | Hagey |
| 1,235,801 A | 8/1917 | Horning |
| 1,497,492 A | 6/1924 | Engel |
| 1,528,992 A | 3/1925 | Rose |
| 1,602,490 A | 10/1926 | Homan |
| 2,124,550 A | 7/1938 | Evans |
| 2,468,191 A | 4/1949 | Fullilove |
| 2,673,399 A | 3/1954 | Raeder |
| 2,692,437 A | 10/1954 | Cook |
| 3,270,421 A | 9/1966 | Jones |
| 3,419,962 A | 1/1969 | Warner |
| 3,837,569 A | 9/1974 | Bradbury |
| 4,314,408 A | 2/1982 | Shoemaker |
| 4,484,395 A | 11/1984 | Samuels |
| 4,495,709 A | 1/1985 | Mainenti |
| 4,811,489 A | 3/1989 | Walker |
| 5,230,158 A | 7/1993 | Wall |
| 5,251,382 A | 10/1993 | Hellar |

(Continued)

*Primary Examiner*—Amy Cohen Johnson
(74) *Attorney, Agent, or Firm*—Katten Muchin Rosenman LLP

(57) ABSTRACT

A measuring device, such as a ruler, tape measure, etc. includes a first edge defining a first region having a first set of indicia corresponding to a first linear scale, and also includes a second edge defining a second region having a second set of indicia corresponding to a second linear scale. Advantageously, each set of indicia consists of hash marks and corresponding numerical values printed or etched on the measuring device. The first linear scale may be actual, e.g., the indicia are spaced apart and labeled with numerical values that correspond to the actual distance between the indicia, while the second linear scale may be non-actual, e.g., the indicia are not spaced apart and labeled with numerical values that correspond to the actual distance between the indicia, such as a linear scale employed on an engineering or architectural drawing. The second set of indicia of the second linear scale are spaced apart and labeled with numerical values that correspond to the scaled distance between the indicia, and therefore provide an indication of the actual length of an object upon measurement of the length of a corresponding feature on a drawing drawn to scale.

2 Claims, 4 Drawing Sheets

U.S. PATENT DOCUMENTS

| | | |
|---|---|---|
| 5,519,943 A | 5/1996 | Snyder |
| 5,746,001 A | 5/1998 | Fisher |
| 5,875,557 A | 3/1999 | Ueki |
| 5,884,408 A | 3/1999 | Simmons |
| 6,237,243 B1 | 5/2001 | Cook |
| RE37,212 E | 6/2001 | Marshall |
| 6,467,180 B1 | 10/2002 | Chan |
| 6,470,582 B1 | 10/2002 | Renko |
| 6,530,159 B2 | 3/2003 | Tarver |
| D503,637 S | 4/2005 | Noel |
| 6,962,002 B2 | 11/2005 | Panosian |
| 7,343,694 B2 * | 3/2008 | Erdfarb ............ 33/759 |
| 2003/0079362 A1 | 5/2003 | Erdfarb |
| 2004/0055174 A1 | 3/2004 | Hirsch |

* cited by examiner

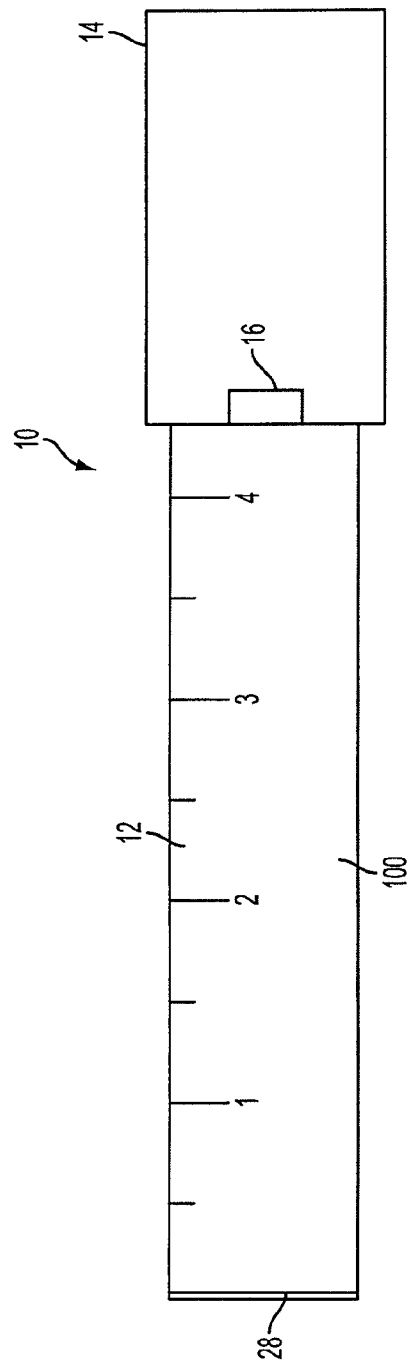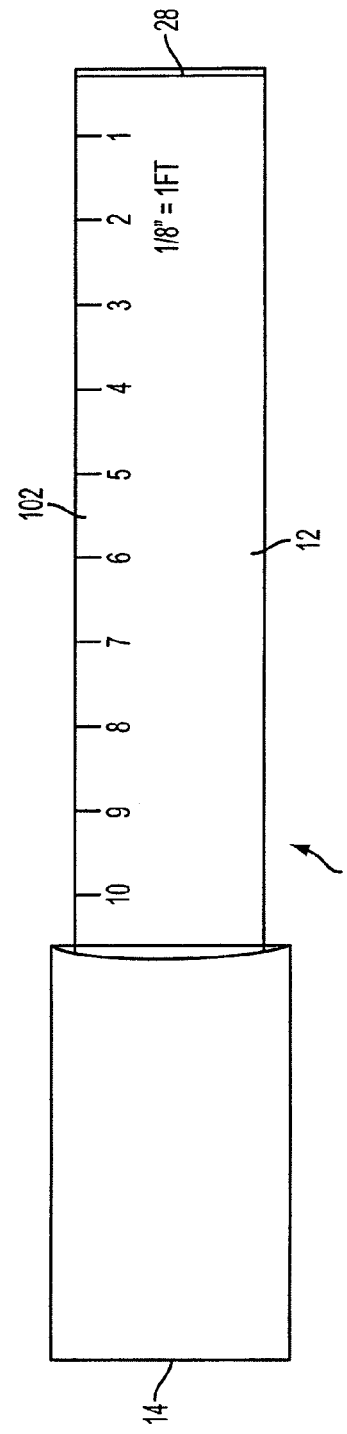
FIG. 4A
FIG. 4B

MEASURING DEVICE

CROSS-REFERENCE TO RELATED APPLICATION

This application is a continuation application of U.S. patent application Ser. No. 10/003,198 filed on Oct. 31, 2001.

FIELD OF INVENTION

The present invention relates generally to measuring devices, and more specifically, in accordance with one example embodiment, to a measuring device having indicia corresponding to various linear scales.

BACKGROUND OF THE INVENTION

There are many devices that may be employed in order to determine an actual length measurement. One such well-known device is a ruler, which is typically a solid piece of wood or plastic having indicia printed or etched thereon. The indicia usually consist of hash marks perpendicular to the edge of the ruler and positioned at a predetermined distance from a starting point of the ruler. The indicia may also consist of numerical values corresponding to the hash marks. Thus, when a user positions the ruler on an item to be measured, the user may employ the hash marks and the numerical values corresponding thereto in order to determine the actual length of the item.

Rulers are typically employed for measuring items that are relatively short in length. In order to measure longer items, folding rulers are often employed. Folding rulers have at least two sections hinged relative to each other. The sections are disposed in parallel when folded but extend so as to be disposed substantially end-to-end when unfolded. Each section is typically a solid piece of wood or plastic having indicia printed or etched thereon. When unfolded, the plurality of sections enable a user to determine the actual length of the item, even though the length of the item is greater than the length of any one section of the folding ruler. However, one disadvantage of folding rulers is that a user must manually unfold the ruler each time the user desires to measure an item, and must re-fold the ruler after the item has been measured.

To avoid the need for continually manipulating a folding ruler, a tape measure is often employed. A tape measure typically includes a thin flexible strip having indicia printed or etched thereon. The strip is typically coiled in a housing and is withdrawn from the housing in order to measure the actual length of an item. The housing may also include a locking mechanism which maintains a desired length of the strip outside of the housing while the user takes the measurement. The housing often includes a spring mechanism which retracts the strip when a user has finished taking a measurement. Because the strip is thin, a relatively long length of the strip may be disposed within a compact housing, enabling the user to determine an actual length measurement which is relatively long.

Currently, there also exist devices which have more than one scale printed or etched thereon. One such device which is employed to determine length measurements is referred to as an architect's ruler. An architect's ruler is typically about twelve inches in length and has a triangular cross-section. The triangular cross-section provides a variety of edges onto which are printed or etched various scales. However, because the architect's ruler is only twelve inches long, it can not be effectively used to measure distances that are greater than twelve inches. It also has the disadvantage that, since it has a triangular cross-section, it does not lay flat when in use, making it cumbersome to use.

Despite the variety of measuring devices that exist, these devices are confusing, ineffective and difficult to use when a user desires to determine a length measurement which is not actual.

SUMMARY OF THE INVENTION

The present invention, according to one example embodiment thereof, relates to a measuring device, such as a ruler, tape measure, etc. The measuring device has a first edge defining a first region. The first region has a first set of indicia corresponding to a first linear scale. The measuring device also has a second edge defining a second region. The second region has a second set of indicia corresponding to a second linear scale. Advantageously, each set of indicia consists of hash marks and corresponding numerical values printed or etched on the measuring device.

In one example embodiment, the first linear scale is actual, e.g., the indicia are spaced apart and labeled with numerical values that correspond to the actual distance between the indicia, and therefore provide an indication of an actual length measurement of an object. In addition, the second linear scale may be non-actual (e.g., the indicia are not spaced apart and labeled with numerical values that correspond to the actual distance between the indicia) such as a linear scale employed on an engineering or architectural drawing. The second set of indicia of the second linear scale are spaced apart and labeled with numerical values that correspond to the scaled distance between the indicia, and therefore provide an indication of the length of a feature on a drawing drawn to scale.

BRIEF DESCRIPTION OF DRAWINGS

FIG. 4a illustrates a first side of a tape depicting a first set of indicia for measurement in inches;

FIG. 4b illustrates a second side of a tape depicting a second set indicia spaced measurement at a scale ratio.

DETAILED DESCRIPTION OF THE INVENTION

Figure 1:
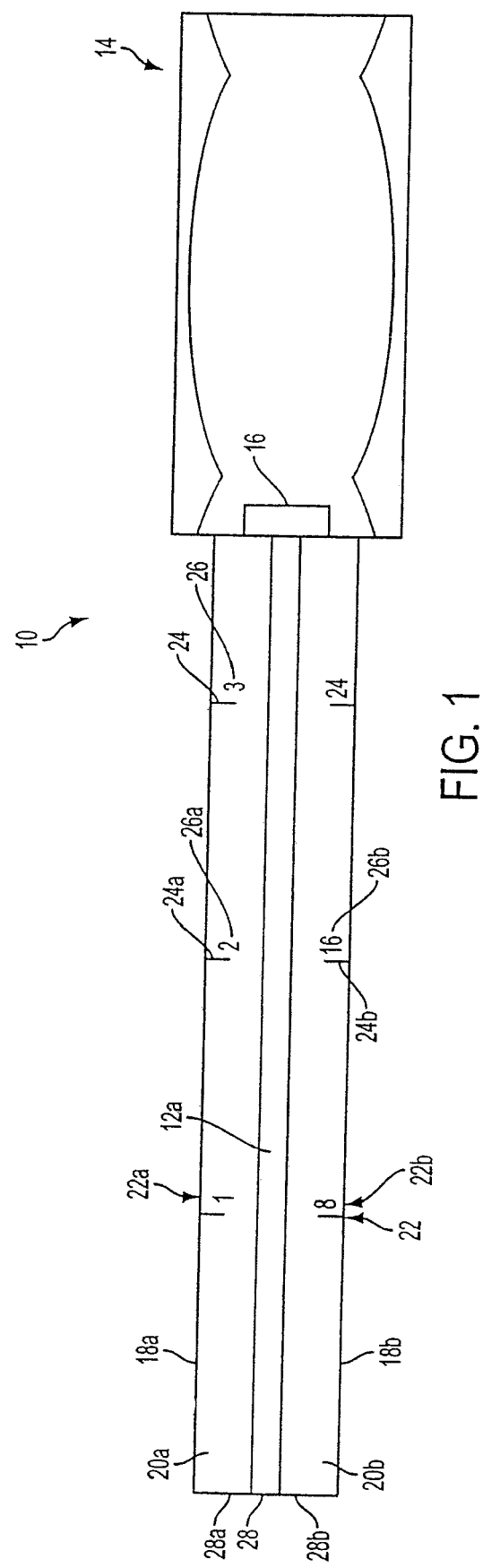
FIG. 1 illustrates a plan view of a measuring device, according to one example embodiment of the invention.

As described above, there are many existing measuring devices that may be employed to determine an actual length measurement. Specifically, the indicia of the typical ruler or tape measure are typically spaced apart and labeled with numerical values which correspond to the actual distance between the indicia. For instance, a ruler (in U.S. units) typically has indicia corresponding to inches, whereby each inch indicia is spaced one inch apart (additional fractional indicia may also be disposed on the ruler between the inch indicia) and each inch indicia has a corresponding printed or etched consecutive numerical value. Thus, the actual length of an item is typically determined by positioning one end of the item at the starting point of the ruler and by reading the numerical value printed on the ruler at the other end of the item.

Because the existing measuring devices have indicia spaced apart and labeled with numerical values that correspond to the actual distance between the indicia (e.g., the one inch indicia of a ruler are actually positioned one inch apart on the measuring device), the existing measuring devices are confusing and difficult to use when a user desires to determine a length measurement which is not actual. There are many such instances when a measurement to be taken is not an actual measurement. For instance, this problem may be encountered when the measuring device is used to determine a length measurement on a drawing, such as an architectural or engineering drawing, which merely provides a representation of the dimensions of an actual object (e.g., a representation of a room, a piece of equipment, the position of a piece of equipment within a room, etc.).

Architectural and engineering drawings are typically drawn to a linear scale which is smaller than (though in some instances, larger than) an actual linear scale. In other words, the features on such a drawing represent actual objects, and features on the drawing are sized relative to each other substantially the same as the actual objects are sized relative to each other in actuality. Typical linear scales that are employed in architectural and engineering drawings are ¾"=1', ½"=1', ⅜"=1', ¼"=1', ⅛"=1' and {fraction (1/16)}"=1', although any linear scale may be employed. For instance, referring to a ½"=1' linear scale, each inch on the drawing corresponds to 2 feet in actuality. Thus, if a feature on a drawing drawn to a ½"=1' linear scale is measured by a user to be one inch long, the user knows that the actual object corresponding to that feature is 2 feet long in actuality. Other linear scales that are typically employed are 1:2, 1:4, 1:8, 1:10, 1:100, etc. For instance, referring to a 1:10 linear scale, each inch on the drawing corresponds to 10 inches in actuality. Thus, if a feature on a drawing drawn to a 1:10 linear scale is measured by a user to be five inches long, the user knows that the actual object corresponding to that feature is 50 inches long in actuality. Again, any conceivable linear scale may be employed The use of existing measuring devices may be confusing when a user attempts to measure the dimensions of a feature on a drawing in order to determine the corresponding actual measurement. For instance, an architectural drawing drawn to ½"=1' linear scale may show a wall to be installed. When a user, using a conventional ruler, measures the length of the wall on the drawing, he may determine that the feature on the drawing corresponding to the wall is 10 inches long. The user must then convert the length measurement that he determined on the drawings into a length measurement which he may employ in actuality. It is very common for mistakes to be made in performing this conversion. For instance, in the above example, instead of correctly calculating that a dimension of ten inches on a drawing drawn to a ½"=1' linear scale is equal to a dimension of twenty feet in actuality, a user may incorrectly calculate the actual dimension, thereby positioning the wall incorrectly. Since this conversion is almost always performed by builders without the aid of a calculator, the likelihood of miscalculating the actual dimension after determining the dimension on the drawing is increased.

FIG. 1 illustrates a plan view of a measuring device, according to one example embodiment of the invention. The measuring device may be a ruler, a folding ruler, a tape measure, or any other conceivable type of measuring device. For the purposes of example only, a tape measure will be described, although the present invention is not intended to be limited in this regard. Tape measure 10 includes a thin flexible strip 12 having indicia 22 printed or etched thereon. Indicia 22 may be in U.S. units (e.g., inches, feet, etc.) or may be in S.I. units (e.g., centimeters, meters, etc.) Strip 12 is coiled in a housing 14 and is withdrawn from housing 14 in order to perform a measurement. Housing 14 also includes a locking mechanism 16 which maintains a desired length of strip 12 outside of housing 14 while the user takes the measurement. Housing 14 may include a spring mechanism (not shown) which retracts strip 12 when a user has finished taking a measurement. Because strip 12 is thin, a relatively long length of the strip may be disposed within housing 14, enabling the user to determine an actual length measurement which is relatively long.

According to the example embodiment shown, strip 12 includes a first edge 18a defining a first region 20a. First region 20a has printed or etched thereon a first set of indicia 22a corresponding to a first linear scale. Indicia 22a consist of hash marks 24a perpendicular to edge 18a and positioned at a pre-determined distance from a starting point 28a. Starting point 28a may be the end 28 of measuring device 10, although this need not be the case. Indicia 22a also consists of numerical values 26a corresponding to and located immediately adjacent to hash marks 24a.

In this example embodiment, the first linear scale is actual, whereby the indicia are spaced apart and labeled with numerical values that correspond to the actual distance between the indicia. In a preferred example embodiment, the first set of indicia include at least indicia corresponding to inches. Thus, each of the inch indicia are actually positioned one inch apart on the measuring device, and the numerical values 26 of each consecutive indicia are consecutively numbered beginning at starting point 28. Additional hash marks representing fractional values may also be disposed between the inch indicia. When the first linear scale is actual, fractional hash marks corresponding to ½ of an inch, ¼ of an inch, ⅛ of an inch and {fraction (1/16)} of an inch are typically employed, often having slightly different lengths to enable a user to more easily distinguish between them.

According to the example embodiment shown, strip 12 also includes a second edge 18b defining a second region 20b. Second region 20b has printed or etched thereon a second set of indicia 22b corresponding to a second linear scale. Indicia 22b consist of hash marks 24b perpendicular to edge 18b and positioned at a pre-determined distance from a starting point 28b. As previously noted, starting point 28b may be the end 28 of measuring device 10, although this need not be the case. Indicia 22b also consists of numerical values 26b corresponding to and located immediately adjacent to hash marks 24b.

In this example embodiment, the second linear scale is non-actual, whereby the second set of indicia 22b are not spaced apart and labeled with numerical values that correspond to the actual distance between the indicia. Instead, the second set of indicia 22b are spaced apart and labeled with numerical values that correspond to a scaled distance between the indicia. For instance, if the second linear scale is ⅛"=1', second region 20b may include indicia which are positioned one inch apart on the measuring device, and which have consecutive numerical values of multiples of eight (e.g., 8, 16, 24, etc.).

Depending on the second linear scale used, additional hash marks representing intermediate values may also be disposed between the scaled indicia. For instance, if the second linear scale is ⅛"=1', the second region 20b may include a primary hash mark corresponding to 8 feet, which is positioned so as to line up with the one inch hash mark of the actual linear scale in first region 20a (provided both sets of indicia employ the same starting point). In this case, second region 20b may also include intermediate hash marks corresponding to 4 feet (lined up with the ½ inch hash mark of first region 20*a*), 2 feet (lined up with the ¼ inch hash marks of first region 20*a*), etc.

Alternatively, the second region 20*b* may include a hash mark corresponding to ten feet, which is positioned so as to line up with the one and one quarter inch hash mark of the actual linear scale in first region 20*a*. In this case, second region 20*b* may also include intermediate hash marks corresponding to 8 feet (lined up with the one inch hash mark of first region 20*a*), 6 feet (lined up with the ¾ inch hash marks of first region 20*a*), etc. Of course, hash marks corresponding to any conceivable intermediate or fractional divisions may be employed both for first region 20*a* and for second region 20*b*.

As previously mentioned, in one example embodiment, each of first set of indicia 22*a* and second set of indicia 22*b* have the same starting point (e.g., end 28 of measuring device 10). Alternatively, each set of indicia may have different starting points. In another example embodiment, such as when each set of indicia have the same starting point, the hash marks of the first set of indicia in region 20*a* may be drawn or etched on strip 12 so as to line up with the hash marks of the second set of indicia in region 20*b*, so that the correspondence between the numerical values of each linear scale are easily ascertainable. Alternatively, the hash marks of the first set of indicia in region 20*a* may not be drawn or etched on strip 12 so as to line up with the hash marks of the second set of indicia in region 20*b*.

Advantageously, the second set of indicia correspond to a linear scale such as ¾"=1', ½"=1', ⅜"=1', ¼"=1', ⅛"=1' or {fraction (1/16)}"=1', which are linear scales that are typically employed in the building trades. However, the second linear scale may be any other conceivable linear scale as may be employed on a drawing. Of course, the second set of indicia may also correspond to a linear scale of 2:1, 4:1, 8:1, or any other conceivable linear scale which increases the size of a feature on a drawing relative to the size of the corresponding object in actuality.

While the example embodiment shown in FIG. 1 illustrates a first set of indicia 22*a* as being actual and a second set of indicia 22*b* as being non-actual, the present invention contemplates that, in accordance with alternative example embodiments thereof, first set of indicia 22*a* is non-actual and second set of indicia 22*b* is actual, or else first and second sets of indicia 22*a* and 22*b* may both be non-actual. In addition, it is noted that, while measuring device 10 is illustrated as having sets of indicia on one side 100 of strip 12 (e.g., the side which is shown in plan view), additional example embodiments of measuring device 10 may employ sets of indicia on both sides 100, 102 of strip 12.

Figure 2:
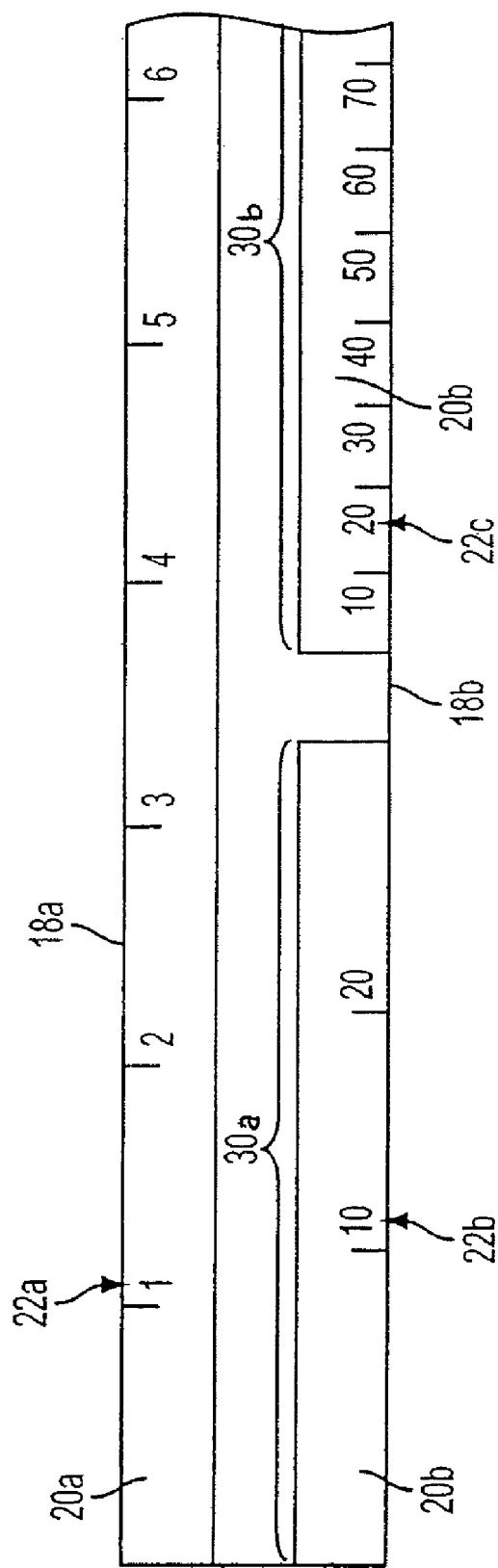
FIG. 2 illustrates a plan view of a measuring device, according to another example embodiment of the invention.

FIG. 2 illustrates a plan view of a measuring device 10, according to another example embodiment of the invention. According to the example embodiment shown, strip 12 includes a first edge 18*a* defining a first region 20*a*. First region 20*a* has a first set of indicia 22*a* corresponding to a first linear scale. Indicia 22*a* consist of hash marks 24*a* perpendicular to edge 18*a* and positioned at a pre-determined distance from a starting point 28*a*. Indicia 22*a* also consists of numerical values 26*a* corresponding to and located immediately adjacent to hash marks 24*a*.

According to the example embodiment shown, strip 12 also includes a second edge 18*b* defining a second region 20*b*. In this example embodiment, second region 20*b* defines a first portion 30*a* and a second portion 30*b*. First portion 30*a* of second region 20*b* has a second set of indicia 22*b* corresponding to a second linear scale, while second portion 30*b* of second region 20*b* has a third set of indicia 22*c* corresponding to a third linear scale. In this way, at least three different linear scales may be disposed on two edges of strip 12, enabling a user to use first portion 30*a* of region 20*b* for drawings employing one linear scale and to use second portion 30*b* of region 20*b* for drawings employing a different linear scale. Of course, it is contemplated that, according to alternative example embodiments, second region 20*b* may define two or more portions, each portion defining a different linear scale. Furthermore, it is also contemplated that, according to still other alternative example embodiments, first region 20*a* may define two or more portions, each portion defining a different linear scale. Portions 30*a* and 30*b* (or any portions wherever disposed on strip 12) may have various lengths.

Figure 3:
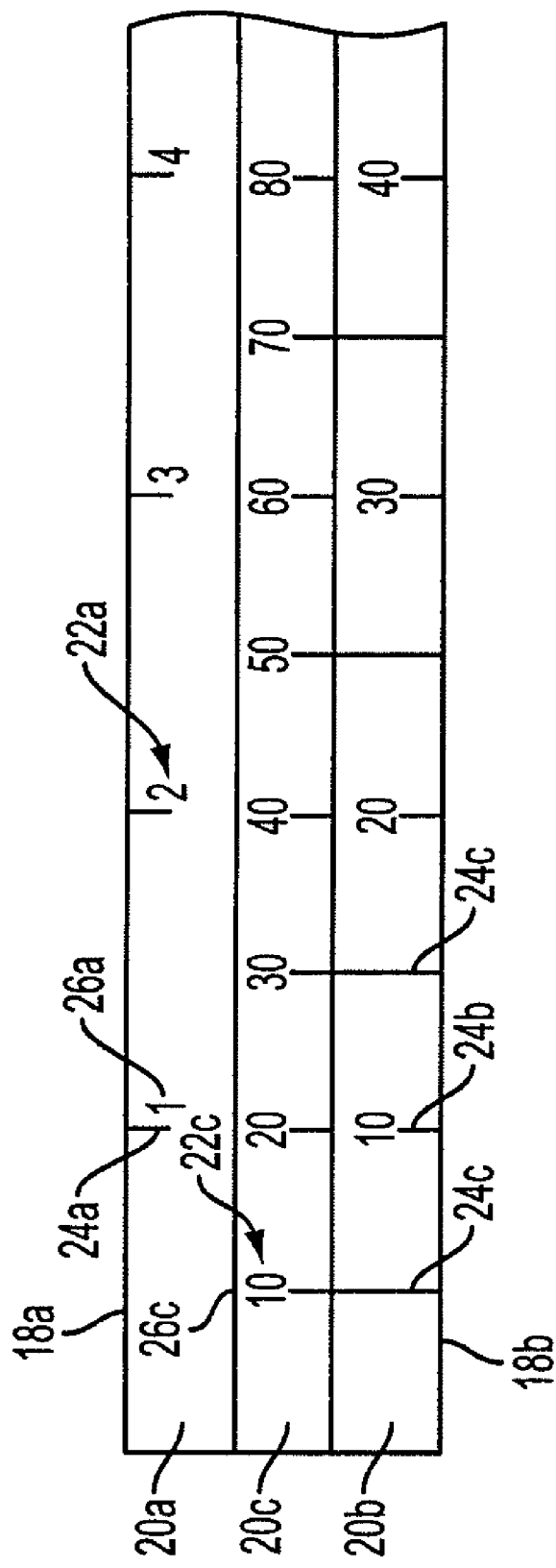
FIG. 3 illustrates a plan view of a measuring device, according to still another example embodiment of the invention.

FIG. 3 illustrates a plan view of a measuring device 10, according to still another example embodiment of the invention. According to the example embodiment shown, strip 12 includes a first edge 18*a* defining a first region 20*a*. First region 20*a* has a first set of indicia 22*a* corresponding to a first linear scale. Indicia 22*a* consist of hash marks 24*a* perpendicular to edge 18*a* and positioned at a pre-determined distance from a starting point 28*a*. Indicia 22*a* also consists of numerical values 26*a* corresponding to and located immediately adjacent to hash marks 24*a*.

According to the example embodiment shown in FIG. 3, strip 12 also includes a second edge 18*b* defining a second region 20*b*. Second region 20*b* has a second set of indicia 22*b* corresponding to a second linear scale. Indicia 22*b* consist of hash marks 24*b* perpendicular to edge 18*b*. Indicia 22*b* also consists of numerical values 26*b* corresponding to and located immediately adjacent to hash marks 24*b*.

Strip 12 also includes a third region 20*c* disposed between first region 20*a* and second region 20*b*. Third region 20*c* has a third set of indicia 22*c* corresponding to a third linear scale. Indicia 22*c* consist of hash marks 24*c* perpendicular to, and preferably extending to, edge 18*b*, although in another example embodiment, hash marks 24*c* are perpendicular to and extend to edge 18*a*. Indicia 22*c* also consists of numerical values 26*c* corresponding to and located immediately adjacent to hash marks 24*c*. In this way, at least three different linear scales may be disposed on strip 12. Of course, it is contemplated that, according to alternative example embodiments, first region 20*a*, second region 20*b* and third region 20*c* may each define any number of portions, each portion defining a different linear scale, thereby enabling the three regions to collectively define more than three different linear scales.

By employing the example embodiments of the invention described herein, the confusion encountered by a user of existing measuring devices when attempting to measure the dimensions of a feature on a drawing in order to determine the corresponding actual measurement may be eliminated. For instance, in the example previously mentioned, wherein an architectural drawing drawn to ½"=1' scale shows a wall to be installed, a user of device 10 may employ a second region 20*b* having a linear scale of ½"=1' to measure the length of the wall. However, instead of using a conventional ruler to measure the length of the wall on the drawing as being ten inches long and then performing a conversion to determine the length of the wall in actuality, the numerical values 26*b* of device 10 clearly show the user that the length of the wall as shown on the drawing is 20 feet, because the indicia 22*b* of region 20*b* have numerical values 26*b* that correspond to the scaled distance. The need for performing a conversion step is thereby eliminated. Upon determining the distance shown on the drawing, the user can then use the indicia 22*a* of measuring device 10 corresponding to the actual linear scale to position the wall in actuality.

By employing other example embodiments of the invention described herein, the confusion encountered by a user of existing measuring devices when attempting to measure the dimensions of a feature on a drawing in order to determine a corresponding non-actual measurement may be eliminated. This may occur when a draftsperson desires to re-draw a feature from one drawing drawn in a first non-actual linear scale to a second drawing drawn in a second non-actual linear scale. For instance, an example embodiment of device 10 may have a first set of indicia 22*a* corresponding to ⅛"=1' scale and a second set of indicia 22*b* corresponding to ¼"=1' scale. The user of an architectural drawing drawn to ⅛"=1' scale may use the first set of indicia 22*a* to determine that the length of a wall as shown on the drawing is 4 feet, because the indicia 22*a* have numerical values 26*a* that correspond to the ⅛"=1' scaled distances. The user may then draw a corresponding feature on an architectural drawing drawn to ¼"=1' scale by using the second set of indicia 22*b* by employing the numerical values 26*b* showing "4 feet" according to the ¼"=1' scaled distance. Again, the need to perform a conversion step (this time, from a dimension in a first non-actual linear scale to a dimension in a second non-actual linear scale) is thereby eliminated.

Thus, the several aforementioned objects and advantages of the present invention are most effectively attained. Those skilled in the art will appreciate that numerous modifications of the exemplary embodiment described hereinabove may be made without departing from the spirit and scope of the invention. Although a single exemplary embodiment of the present invention has been described and disclosed in detail herein, it should be understood that this invention is in no sense limited thereby and that its scope is to be determined by that of the appended claims.

The invention claimed is:

1. A method of determining a scaled distance on a blueprint and transferring the determined distance to a building material, the method comprising:
   providing a tape measure having a first set of indicia spaced at one inch intervals on a first side of a tape, and a second set of indicia on a second side of the tape spaced at intervals correlating to a scaled ratio compared to the first set of indicia, said scaled ratio conforming to a scaled ratio of the blueprint, wherein both the first and second set of indicia ascend numerically in a direction away from a starting point at an end of the tape;
   placing the second side of the tape adjacent the portion of the blueprint to be measured, such that the starting point of the tape aligns with at least one end of the distance to be measured;
   determining on the second side of the tape a distance from the staring point to an end point of the distance to be measured;
   reading a value from the second side of the tape at the distance to be measured;
   placing the first side of the tape on the building material;
   extending the tape until the distance extended on the first side corresponds to the value read from the second side; and
   marking the distance on the building material.

2. A method of comparing a scaled distance on a blueprint with a length of a building material, the method comprising:
   providing a tape measure having a first set of indicia spaced at one inch intervals on a first side of a tape, and a second set of indicia on a second side of the tape spaced at intervals correlating to a scaled ratio compared to the first set of indicia, said scaled ratio conforming to a scaled ratio of the blueprint, wherein both the first and second set of indicia ascend numerically in a direction away from a starting point at an end of the tape;
   placing the second side of the tape adjacent the portion of the blueprint to be measured, such that the starting point of the tape aligns with at least one end of the distance to be measured;
   determining on the second side of the tape a distance from the staring point to an end point of the distance to be measured;
   reading a value from the second side of the tape at the distance to be measured;
   placing the first side of the tape on the building material;
   extending the tape until the distance to be compared can be read from the first side of the tape; and
   comparing the distance on the first side of the tape with the distance measured on the blueprint using the second side of the tape.

* * * * *